May 21, 1935. E. R. COX 2,002,340
RECOVERY OF STABLE GASOLINE FROM NATURAL GAS
Filed Sept. 30, 1930
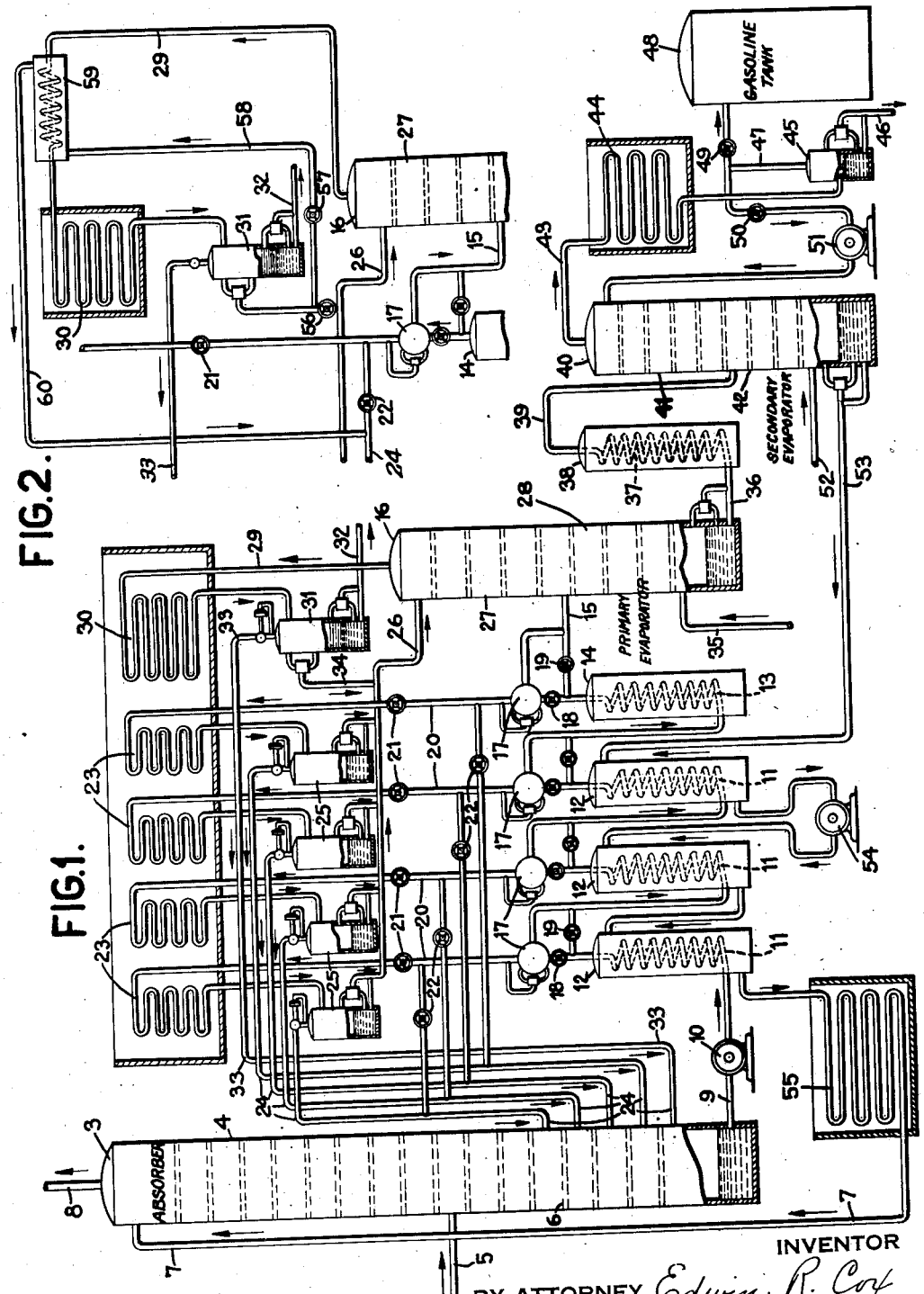
INVENTOR
Edwin R. Cox
BY ATTORNEY
R. J. Dearborn.

Patented May 21, 1935

2,002,340

UNITED STATES PATENT OFFICE 2,002,340

RECOVERY OF STABLE GASOLINE FROM NATURAL GAS

Edwin R. Cox, Los Angeles, Calif., assignor to The Texas Company, New York, N. Y., a corporation of Delaware Application September 30, 1930, Serial No. 485,361

10 Claims. (Cl. 196—8)

This invention relates to the recovery of gasoline from natural gas by absorbing the gasoline in a liquid absorption medium and has to do particularly with a method and apparatus for separating, prior to the recovery of the gasoline therefrom, the undesired constituents of the rich absorbent liquid so that only a stable gasoline remains absorbed therein.

The usual method of absorbing gasoline from natural gas is to absorb enough of the vapors from the natural gas to insure obtaining all of the desired gasoline components. As a result, the absorbent oil contains not only the natural gasoline, but also a relatively large amount of lighter combustible constituents. Usually, the absorbed gasoline and lighter combustible hydrocarbons are distilled as a mixture from the absorbent oil. The resulting product contains so much of the light combustible constituents that it is often termed a wild gasoline, which cannot be stored except under considerable pressure or at a relatively low temperature. This wild gasoline is then stabilized by a suitable method consisting usually of either weathering the product or fractionating it in a suitable stabilizer to remove the extremely volatile gases and vapors therefrom.

The principal object of the present invention is to devise a method and means whereby the constituents lighter than gasoline are removed in the early stages of the absorption process and only the desired stable gasoline is contained in the resulting absorbent liquid. In its broader aspects, the invention contemplates a method by which the rich absorbent oil from the absorber is gradually heated, the light ends of the gasoline and light combustible hydrocarbons are distilled, the vapors fractionated or otherwise separated into the light ends of the gasoline and the light combustible hydrocarbons, the light ends combined with the heavier constituents of the gasoline in the absorbent oil and a stable gasoline only is left in the absorbent oil which may then be recovered. More particularly, according to the invention, the rich absorbent oil is gradually heated in a series of heat exchangers, preheaters and evaporators to vaporize the light ends of the gasoline and lighter combustible hydrocarbons, the vapors fractionated in part or in whole in a series of fractionating towers to eliminate the light combustible hydrocarbons from the light ends of gasoline and these light ends returned to the absorbent oil.

The advantages of the process of the invention are a substantial saving in the steam consumption and of cooling water to condense the light constituents of the gasoline. A substantial saving of steam is realized in the stripping of the gasoline from the oil, since the undesired constituents are eliminated before they reach the final evaporator. Furthermore, by eliminating the light gases in the initial stages of the operation and passing them out with the dry gas, it is unnecessary to use steam power to recompress these vapors to recover their gasoline content, as is done in the usual practice. Also, since a stabilizer is unnecessary in my process, there is a substantial saving in the steam required to reboil liquids at the bottom of the stabilizer and a substantial saving in circulating water formerly required to condense the steam and to cool the reflux used in the operation of the stabilizer.

The invention may be more clearly understood by referring to the drawing, which illustrates certain modifications of apparatus suitable for carrying out my process. Fig. 1 represents a complete absorption system. Fig. 2 is a modification of Fig. 1, in which the vapors from the primary evaporator are condensed to separate steam and then the oil distillate revaporized before introducing it into the secondary fractionating tower.

Referring to Fig. 1, the reference character 3 represents a combined absorber and rectifying tower wherein absorption and rectification occurs. The section 4 above the inlet 5 for wet gas comprises the absorber, while the section 6 on which the absorber is superimposed and below the wet gas inlet 5 comprises a fractionating or rectifying tower. The absorbent liquid is introduced at the upper portion of the tower through the pipe 7. The dry gases, from which substantially all the gasoline vapors have been removed, are released at the top of the tower by the pipe 8. A rich absorbent liquid is drawn from the bottom of the tower through the pipe 9 and forced by the pump 10 through a series of coils 11, located in heat exchangers 12, and through coil 13, located in preheater 14, from where it is finally introduced through the pipe 15 into the chamber 16.

A series of vents 17 are located at the exit of each of the coils 11 and 13 to release vapors as the oil gradually becomes heated. The vents, however, may be by-passed by suitable regulation of valves 18 and 19 whereby the oil is passed directly to the chamber 16 without release of any vapors. If the vapors are released in the vents 17, they pass up the lines 20, and by suitable regulation of the valves 21 and 22, may be passed either directly to the fractionating tower 6 through the lines 24 or diverted to the coolers 23. In case the vapors are passed to the coolers 23, they are partially condensed therein to remove the heavier constituents and the condensate employed as a reflux medium in the fractionating tower at the top of the chamber 16, which will be more fully described hereinafter. Receivers 25 are provided for receiving the condensate from coolers 23. The uncondensed vapors are released from the receivers through lines 24 and enter the lower portion of the rectifying section of the tower 3 at different levels, depending on their volatility.

The chamber 16 comprises a fractionating tower 27 above the vapor inlet line 15 and a primary evaporator or partial distilling chamber 28, below the line 15, on which the fractionating tower 27 is superimposed. Vapors are removed from the top of fractionating tower 27 through the line 29 and the heavier portions thereof condensed in the cooler 30. The condensate is then collected in receiver 31, which is equipped with water drain 32, vapor line 33 and a condensate draw-off pipe 34. The uncondensed vapors from the receiver 31 pass through line 33 to the bottom of the lower portion of tower 3 where they enter below the point of entrance of the lighter vapors from receivers 25. The condensate from draw-off line 34 joins the condensate from receivers 25 in the line 26 and the mixture is passed to the top of fractionating tower 27 to act as a reflux medium. The primary evaporator 28 is provided with a steam line 35 for introducing steam if necessary to increase the vapor pressure of the vapors therein. The partially denuded absorbent oil from evaporator 28 is then passed through a line 36 and coil 37 in preheater 38, thence through line 39 to enter midway, the chamber 40.

The chamber 40 also comprises a combined fractionating tower and evaporator. The section 41 above the inlet line 39, constitutes a fractionating tower and is superimposed on the evaporator 42, located below the inlet of line 39. Vapors are taken off from the secondary fractionating tower 41 through the line 43 and lead through the condenser 44 where they are condensed and the distillate collected in receiver 45. This receiver is equipped with water drain 46 and a pipe 47 for drawing off the condensate. The condensate may be passed from the line 47 either to the run-down tank 48 or by suitable regulation of the valves 49 and 50, a portion may be pumped to the top of fractionating tower 41 by the pump 51 to act as a reflux medium. At the bottom of the evaporator 42 is a pipe 52 for introducing steam to aid in the stripping of the absorbent liquid. A lean absorbent liquid is released from the bottom of the fractionating tower 42 through the line 53 and flows through the heat exchangers 12 where it gives up its heat to the rich absorbent oil. The lean absorbent oil is usually under sufficient pressure to flow through the last of the heat exchangers 12, from where it is picked up by the pump 54, forced through the remaining heat exchangers, the cooler 55 and line 7, back to the top of absorber section 4 of tower 3.

In the modification shown in Fig. 2, the condensate from receiver 31, instead of being returned as a reflux to the top of the fractionating tower 27, may be diverted to line 58 by suitable regulation of valves 56 and 57. From line 58 the condensate is passed through heat exchanger 59, where it comes into contact with the hot vapors from the fractionating tower 27, thereby condensing the vapors and revaporizing the condensate. The vaporized condensate is then passed through line 60 to the lower portion of tower 3 by the way of line 24 mentioned heretofore.

While the chamber 3 is preferably constructed as a combined absorber and rectifying tower, the invention contemplates a separate arrangement for those elements. This also applies to chambers 16 and 40 wherein the fractionating towers and the evaporators may likewise be separate elements. In some cases it is possible that the entire chamber 16 or just the fractionating tower 27 may be eliminated. It is also to be understood that the heat exchangers 12 may be either a plurality as indicated in the drawing, or a single heat exchanger. In case the chamber 16 or any of the heat exchangers 12 are eliminated, it is of course understood that the coolers 23 or 30, the receivers 25 or 31, and the connections, respectively, would also be eliminated.

In practicing the invention, with an apparatus such as illustrated in the drawing, a wet gas containing a substantial amount of gasoline is introduced to an intermediate portion of the absorber and rectifier through the pipe 5. The absorber is preferably maintained under a pressure of approximately 30 lbs. per sq. in. In the upper portion of this absorber all the gasoline and a substantial amount of lighter combustible hydrocarbons are absorbed in the lean absorbent oil which is introduced at the top of the tower through line 7. The dry gas, stripped of its vapors, is released through line 8. The rich absorbent oil flows by gravity into the lower or rectification section 6 of tower 3 where it comes into contact with vapors introduced at various elevations thereof. In this section the absorbent oil is heated sufficiently by the vapors to release the dry gases therefrom. The rich absorbent oil is drawn from the bottom of the rectifying tower by pump 10 and the pressure boosted to about 75 lbs. per sq. in. As the oil is forced through the heat exchangers 12 and preheater 14, the pressure drops approximately 10 lbs. in each unit so that the oil is under approximately 35 lbs. by the time it reaches the evaporator 28.

According to one modification, vapors are released in the vents 17 and passed to coolers 23. Since the oil is gradually heated as it passes through the heat exchangers and the preheater, vapors of progressively higher boiling point are removed. The condensate collecting in receivers 25 are passed to the fractionating tower 27 and the uncondensed vapors, which are of progressively increasing density, are introduced through lines 24 at different levels to the rectification section 6 of tower 3. The lighter vapors are accordingly introduced in the uppermost part and the heavier fractions at spaced distances down the section 6. In this way, a partial separation of the undesired fractions is accomplished in the tower 6, and the separation completed in the evaporator 28 and fractionating tower 27. Steam may be introduced, if necessary, through the line 35 at the bottom of evaporator 28, to maintain the working pressure of approximately 35 lbs. per sq. in. It will thus be seen that the rich absorbent oil from the time it enters tower 6 to the time it leaves evaporator 28, is gradually heated and the undesirable constituents separated.

If the undesired fractions are propane and lighter, and the desired fractions are butane or heavier, for example, then the absorbent oil withdrawn through the line 36 at the bottom of the evaporator 28 should be substantially free from constituents lighter than butane. At the same time a proper regulation of the process requires that substantially no butane should accordingly be lost in the dry gas, which is released through the dry gas line 8 at the top of the absorber. This requirement is met by circulating the right amount of absorbent oil properly denuded of gasoline. It is consistent with theory and has been confirmed by practice that the oil to gas ratio is fixed by the temperature and pressure in the absorber and by the character of the absorbent oil, but it is independent of the richness of the gas. Hence, with the proper oil to gas ratio, all the butane is recovered in the absorber, regardless of the amount recirculated in the vapor through lines 24 and 33 since the effect of this is merely to enrich the gas.

The partially denuded absorbent oil, which, in the instance just given, is free from constituents lighter than butane, is next preheated in preheater 38 which may be of the steam type and the preheated oil charged to the secondary evaporator 42. Vapors evolved in this evaporator are fractionated in the superimposed tower 41, the vapors withdrawn through line 43 and condensed in condenser 44. A stable gasoline is collected in receiver 45 wherein a separation of condensed water is made and the distillate passed to rundown tank 46. A portion of this condensate is preferably returned, by the pump 51 and by suitable regulation of valves 49 and 50, to the top of fractionating tower 41 as a reflux medium. Steam is preferably introduced into the secondary evaporator 42, through the line 52. The lean absorbent oil from evaporator 42 is under sufficient pressure, usually about 15 lbs. per sq. in., to force it through a part of the heat exchangers 12. It is then pumped through the remainder of the heat exchangers, with a suitable pump 54, and through the cooler 55 back to the absorber. In the cooler 55 the lean absorbent oil is reduced in temperature sufficient to maintain the desired degree of absorption and to insure no loss of desired constituents in the dry gas.

In a simpler modification, the valves 18 are closed and the valves 19 opened thereby by-passing the vents 17, whereby the undesired fractions in the absorbent oil, withdrawn from the bottom of the tower 3, are entirely removed in the evaporator 28. In this case only one condensate is collected; this is the condensate in receiver 31, which is returned to the fractionating tower 27 as a reflux medium, and accordingly only one vapor fraction is returned to the tower 3 through the line 33.

In another modification, vapors are released in vents 17, but instead of passing to coolers 23, the valves 21 are closed and the entire vapor fractions introduced at different levels, according to their densities, into the lower portion of tower 3. The manner of handling the vapors from fractionating tower 27 would remain the same as in the previous modification.

In a further modification, as illustrated in Fig. 2, valves 21 would remain closed again, and the vapors from the vents 17 returned to the tower 3, as already described. In this instance, however, the vapors from the fractionating tower 27 may be passed directly to a cooler 30 and the condensate collected in receiver 31. In this receiver any condensed water is separated and the distillate passed by line 58, the valve 56 being closed, to the exchanger 59 where they are revaporized by the vapors from the evaporator 27. These vapors are then returned to the lowest portion of the tower 3, where they enter at a position corresponding to their relative density.

It is to be observed that still further modifications in the operation of the process may be accomplished without departing from the spirit of the invention. For example, it may be possible in some cases, from the nature of the product absorbed, that the fractionating tower 27 may be eliminated, or even the fractionating tower and the evaporator 28 may both be eliminated, in which case all the undesired fractions would be removed in the heat exchangers or preheater and a final separation made in the absorption and rectification tower 3. Or it may be possible in cases wherein the separation of fractions lighter than gasoline is relatively easy, that the vents 17 above the exchangers 12 may be eliminated as well as the fractionating tower 27 and evaporator 28. In the latter instance, all the undesired light fractions would then be removed through the vent 17 above the preheater 13 and rectified in the tower 3. In any case, wherein the fractionating tower 27 and evaporator 28 are eliminated, an absorbent oil containing the stable gasoline would pass directly to the final evaporator 42. It will be apparent therefore, that the invention is not limited to any specific details in parts or uses specified, but only such limitations are to be imposed as are indicated in the appended claims.

I claim:

1. In the recovery of gasoline from natural gas, the process that comprises charging a liquid absorbent downwardly through a zone of absorption, introducing a rich gas into an intermediate portion of said zone, withdrawing a substantially dry gas from the upper portion and rich absorbent containing the desired gasoline and other lighter constituents from the lower portion of said zone, gradually heating the rich absorbent and distilling therefrom a plurality of fractions of different volatility containing substantially all of said other constituents and returning the latter, at different elevations, to the lower portion of said absorption zone and finally recovering a stable gasoline from the rich absorbent.

2. The process according to claim 1 in which the fractions of different volatility are introduced into the absorption zone below the point of introduction of rich gas at elevations progressively lower in direct order of their boiling points from low to high.

3. In the recovery of gasoline from natural gas, the process that comprises charging an absorbent oil downwardly through a zone of absorption, passing a wet gas countercurrently to the absorbent oil in said zone to absorb the gasoline and a substantial amount of other lighter constituents from the gas, withdrawing a rich absorbent oil from the lower portion of said zone and subjecting the same to partial distillation in a plurality of stages to remove said other lighter constituents from the absorbent oil as fractions of different volatility, returning said fractions to the absorption zone and introducing the same into said zone at elevations progressively lower in direct order of the boiling points of the fractions from low to high and separating by distillation a stable gasoline from the resultant rich absorbent oil.

4. In the recovery of gasoline from natural gas, the process that comprises absorbing the gasoline and a substantial amount of other lighter hydrocarbons from the natural gas in an absorbent oil in a zone of absorption, subjecting the resultant rich absorbent to partial distillation in a plurality of steps including stages of heat exchange and primary distillation wherein said other lighter hydrocarbons and a portion of the desired gasoline are distilled into fractions of different volatilities, subjecting at least a portion of said fractions to partial condensation to condense the desired gasoline therefrom and returning the condensates to the primary distillation stage to recombine with the absorbent oil, returning the uncondensed portions of said fractions of other lighter hydrocarbons to the absorption zone, withdrawing rich absorbent containing substantially only the desired gasoline from the primary distillation stage and recovering a stable gasoline therefrom in a secondary distillation stage.

5. In the recovery of gasoline from natural gas, the process that comprises absorbing the gasoline and a substantial amount of other lighter hydrocarbons from a wet gas in an absorbent oil in a zone of absorption, withdrawing a rich absorbent oil from said zone and preheating the same, thereby vaporizing and separating therefrom the more volatile portion of said other lighter hydrocarbons, subjecting the preheated rich absorbent to fractional distillation and separating the less volatile portion of said other lighter hydrocarbons in a primary distillation and fractionation zone, returning vapors of both separated portions of said other light hydrocarbons to the absorption zone, passing a rich absorbent oil containing substantially only the desired gasoline from the primary distillation and fractionation zone to a final distillation and fractionation zone and recovering in the latter a stable gasoline from the absorbent oil.

6. The method according to claim 5 in which at least a portion of the vapors of said other light hydrocarbons, prior to the return thereof to the absorption zone, are subjected to partial condensation to form a condensate and the condensate returned for use as a reflux medium to the primary distillation and fractionation zone.

7. In an apparatus for the recovery of gasoline from natural gas, the combination of an absorber, one or more heat exchangers, primary and secondary evaporators, means for passing a rich absorbent oil from the absorber through said heat exchangers to the primary evaporator, means for venting off vapors from the heat exchangers and the primary evaporator, means for conducting said vapors separately to different points in the absorber, means for passing absorbent oil from the primary to the secondary evaporator and means for passing a lean absorbent from the secondary evaporator through said heat exchangers in indirect heat exchange with the rich absorbent therein.

8. In an apparatus for recovering gasoline from natural gas, an absorber, one or more heat exchangers and a primary and a secondary evaporator, means for passing a rich absorbent oil from the absorber successively to the exchangers and evaporators, means for venting vapors from the heat exchangers, a fractionator adapted to receive vapors from the primary evaporator, means for separately passing vapors vented from the heat exchangers and vapors from the fractionator to separate points in said absorber and means for passing a lean absorbent from the secondary evaporator through said heat exchangers in indirect heat exchange with the rich absorbent therein.

9. An apparatus as described in claim 8 and in addition thereto a partial condenser for partially condensing the vapors from the fractionator prior to the return thereof to the absorber and means for refluxing the resulting condensate to the fractionator.

10. An apparatus as described in claim 8 and in addition thereto means including partial condensers and condensate lines for partially condensing the vapors vented from the heat exchangers and for returning the resulting condensates to the fractionator prior to the introduction of said vapors to the absorber.

EDWIN R. COX.